United States Patent [19]

Schmidt et al.

[11] 4,185,867

[45] Jan. 29, 1980

[54] HARVESTER WITH A LATERALLY EXTENDING VISOR STRUCTURE

[75] Inventors: William M. Schmidt; Stanley E. Thorwaldsen, both of Grosse Pointe, Mich.; David C. McElroy, Pasadena, Calif.; Stephen G. Miggels, Southfield, Mich.

[73] Assignee: Allis-Chalmers Corporation, Milwaukee, Wis.

[21] Appl. No.: 903,693

[22] Filed: May 8, 1978

[51] Int. Cl.² .............................................. B62D 27/02
[52] U.S. Cl. ................................ 296/187; 180/89.12; 296/84 B; 296/95 R
[58] Field of Search ................. 296/28 C, 35 R, 84 B, 296/137 R, 95 R; 180/89.12

[56] References Cited

U.S. PATENT DOCUMENTS

| D. 154,735 | 8/1949 | Arbib | 296/95 R |
| 3,278,222 | 10/1966 | Mullet | 296/28 C |
| 3,568,418 | 3/1971 | Copley | 296/28 C |
| 4,007,958 | 2/1977 | Peifer | 296/28 C |

FOREIGN PATENT DOCUMENTS 700193  11/1953  United Kingdom ................. 296/28 C Primary Examiner—Joseph F. Peters, Jr.
Assistant Examiner—John A. Carroll
Attorney, Agent, or Firm—Charles L. Schwab

[57] ABSTRACT

A visor structure is provided for the cab of a harvester which has horizontal parts which extend forwardly and laterally outwardly from the top of the cab to approximately the tread of vehicle and approximately to the lateral extremities of the grain bin mounted immediately behind the cab. The visor structure supports forwardly directed operating lights and rear view mirrors. The cab is provided with an access door at one lateral side and a walkway extends laterally outwardly therefrom. The visor structure does not extend over the walkway, thus freely permitting operator ingress and egress. The visor structure also includes a part extending forwardly from the cab. The top of the visor structure, the top of the cab and the top of the grain bin lie substantially in a common horizontal plane.

17 Claims, 6 Drawing Figures

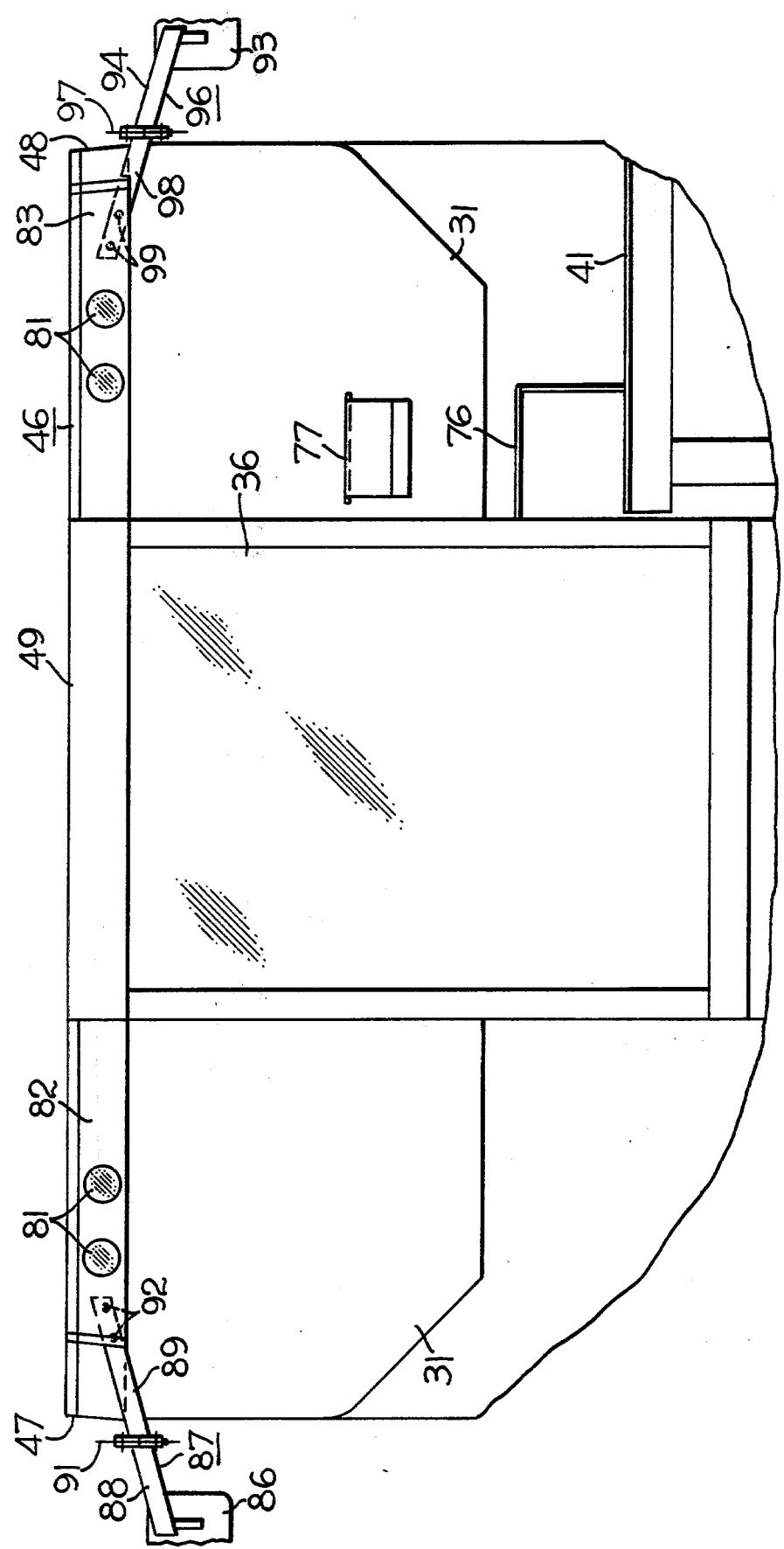

HARVESTER WITH A LATERALLY EXTENDING VISOR STRUCTURE

This invention relates to an agricultural harvester provided with a visor structure for the operator's cab.

BACKGROUND OF THE INVENTION

Operator cabs have been provided at the front of a harvester between the front wheels thereof and adjacent to a transversely mounted grain tank, one such harvester being shown in U.S. Pat. No. 2,834,633. Top shields for vehicles are shown in U.S. Pat. Nos. 2,643,912 and 2,643,913 and also in French Pat. No. 1,305,885. U.S. Pat. No. Re. 29,123 illustrates a cab with lights mounted in the front of a roof structure.

SUMMARY OF THE INVENTION

The self-propelled harvester in which the present invention is incorporated has a pair of laterally spaced front wheels of predetermined tread. A cab is disposed on the front of the harvester between the front wheels, the cab having a width substantially less than the tread of the front wheels. A visor structure mounted on the cab includes a pair of horizontally extending parts which extend laterally outwardly from the roof portion of the cab to substantially the tread of the front wheels. The horizontally extending parts of the visor structure may serve to support lights for illuminating the area forwardly of the cab and may also support rear view mirrors.

The harvester may include a walkway at one lateral side of the cab which extends outwardly from an access door and the visor structure may be constructed and arranged so as to leave an open area above the walkway to facilitate operator ingress and egress. The upper extremities of the cab and visor structure may lie in substantially the same generally horizontal plane and the visor structure may include a part which extends forwardly from the top of the cab. The cab may be disposed immediately forward of the transversely mounted grain tank which may be approximately coextensive with the tread of the vehicle and with the visor structure. The top of the grain tank may lie in the same generally horizontal plane as the top of the cab and visor structure.

In summary, the present invention is directed to providing improved sun shielding of the operator's cab and also an improved mounting arrangement for the lights and rear view mirrors. A vertical open area is provided in the visor structure at one lateral side of the vehicle so as to facilitate entrance and exit of the operator to and from the cab.

BRIEF DESCRIPTION OF THE DRAWINGS

One embodiment of the invention is illustrated in the drawings in which:

FIG. 6 is an enlarged front view of the operator cab portion of the harvester.

DETAILED DESCRIPTION OF THE DRAWINGS

Figure 1:
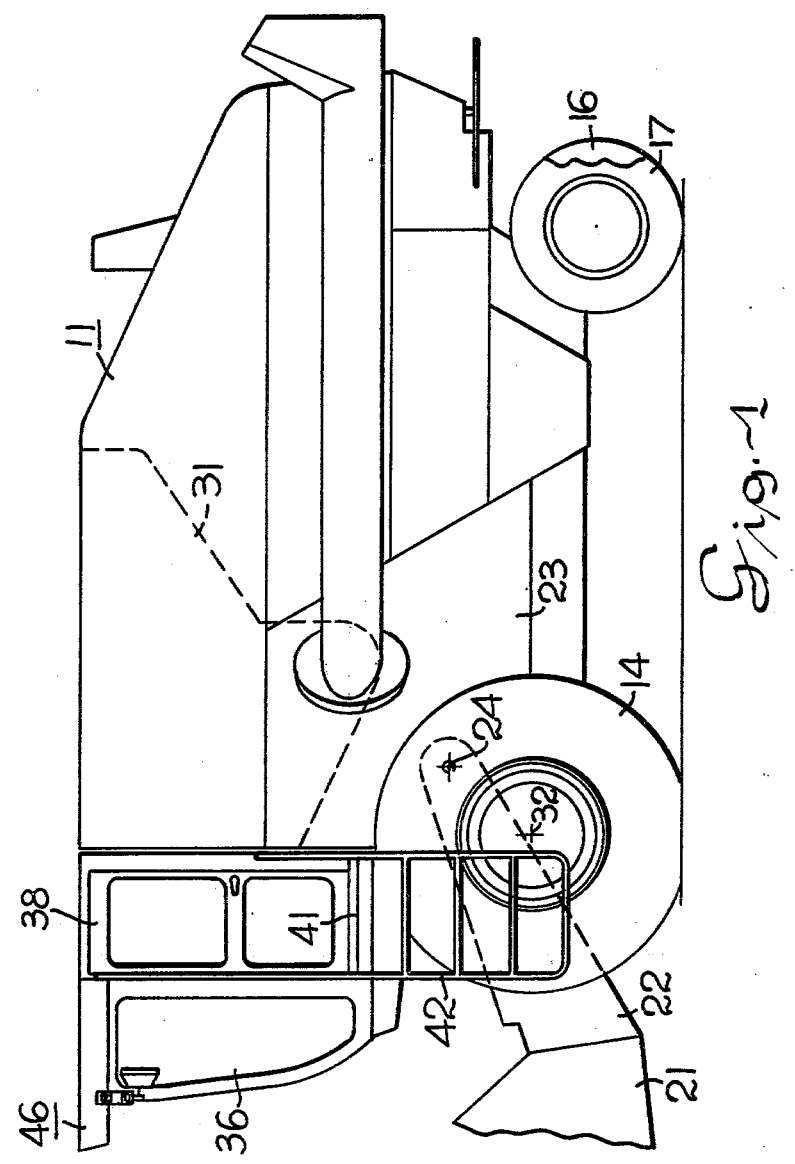
FIG. 1 is a left side view of a harvester incorporating the invention.
Figure 2:
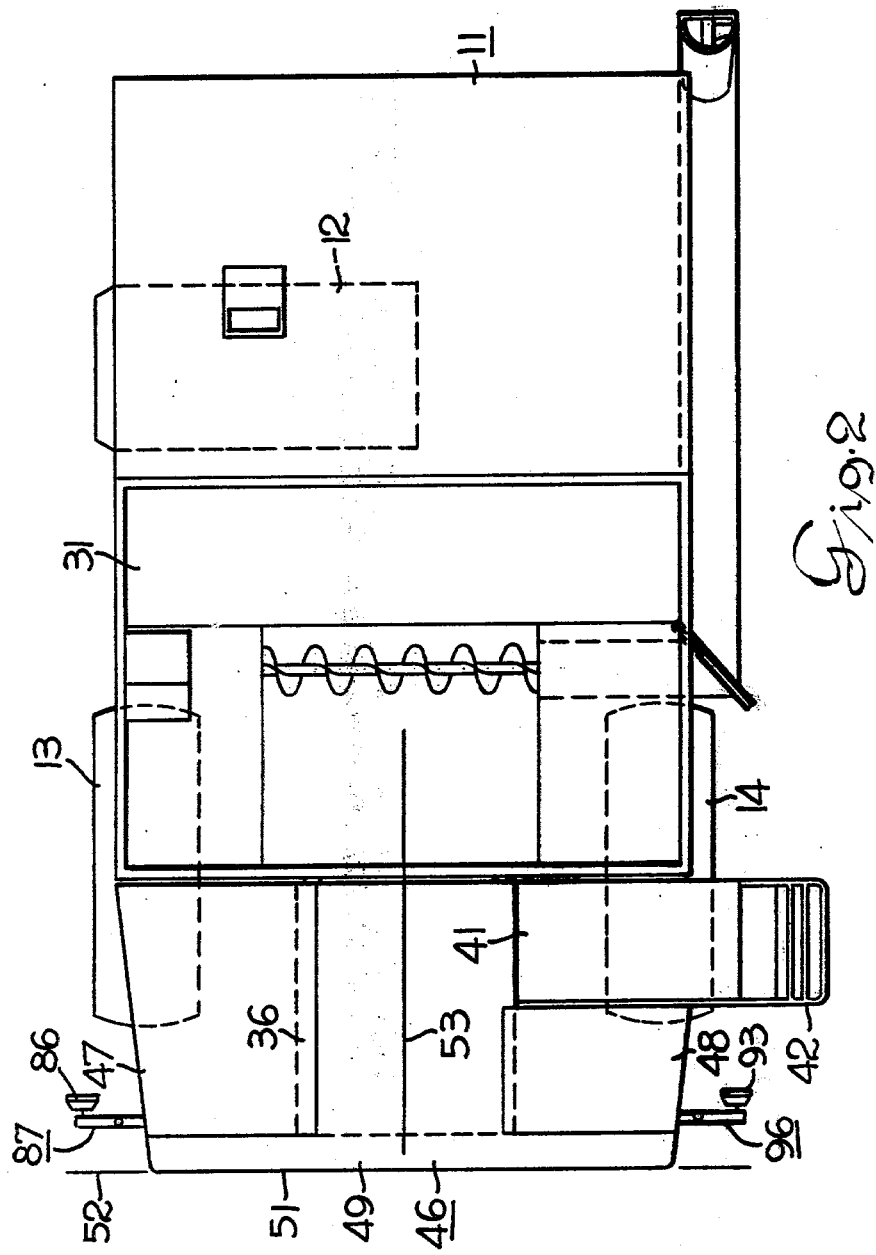
FIG. 2 is a top view of the harvester shown in FIG. 1.

Referring to FIGS. 1 and 2, an agricultural combine or harvester 11 is illustrated. The harvester 11 is of the self-propelled type having an engine 12 which is connected in driving relation to a pair of laterally spaced front driving wheels 13, 14 through a power train (not shown). The rear of the harvester 11 is supported on a pair of laterally spaced steerable wheels 16, 17. A suitable crop header 21 is detachably connected to a feeder conveyor 22 which in turn has its rear end pivotally mounted on the frame 23 of the harvester 11 on a transverse pivot axis 24. The cutting height of the header 21 is adjusted through pivoting the feeding conveyor 22 about its axis 24 by suitable means (not shown). A grain tank 31 is positioned on the main frame 23 generally rearwardly of and above the axis of the front wheels 16, 17. The grain tank 31 of the harvester extends crosswise from one lateral side thereof to the other. The grain tank 31 is approximately as wide as the tread of the front wheels 13, 14 and is disposed generally above and to the rear of the transverse axis 32 of the front wheels 13, 14.

An enclosed operator's cab 36 is mounted on the main frame 23 of the harvester 11 in a position above and forward of the transverse axis 32 of the front wheels 13, 14. The cab 36 is disposed directly in front of the grain tank 31 and is disposed centrally between the drive wheels 13, 14. As illustrated in the drawings, the width of the cab 36 is substantially less than the distance between the front wheels 13, 14. An access door 38 is provided at the left lateral side of the cab 36. A walkway 41 is mounted on the main frame 23 of the combine and extends laterally outwardly from the bottom of the cab 36 adjacent the door 38 and a downwardly depending ladder 42 is carried by the laterally outer end of the walkway 41. The ladder 42 and the walkway 41 provide convenient operator egress and ingress to and from the cab 36 by way of the door 38. A unique visor structure 46 is rigidly secured to the top of the cab 36 and includes horizontally extending parts 47, 48 which extend laterally outwardly from the top of the cab 36 and a horizontal part 49 which extends forwardly from the cab 36. As seen in FIG. 2, the forward edge 51 of the visor structure 46 lies in a transverse line 52 which is at right angles to the vertical central plane 53 of the harvester 11.

Figure 3:
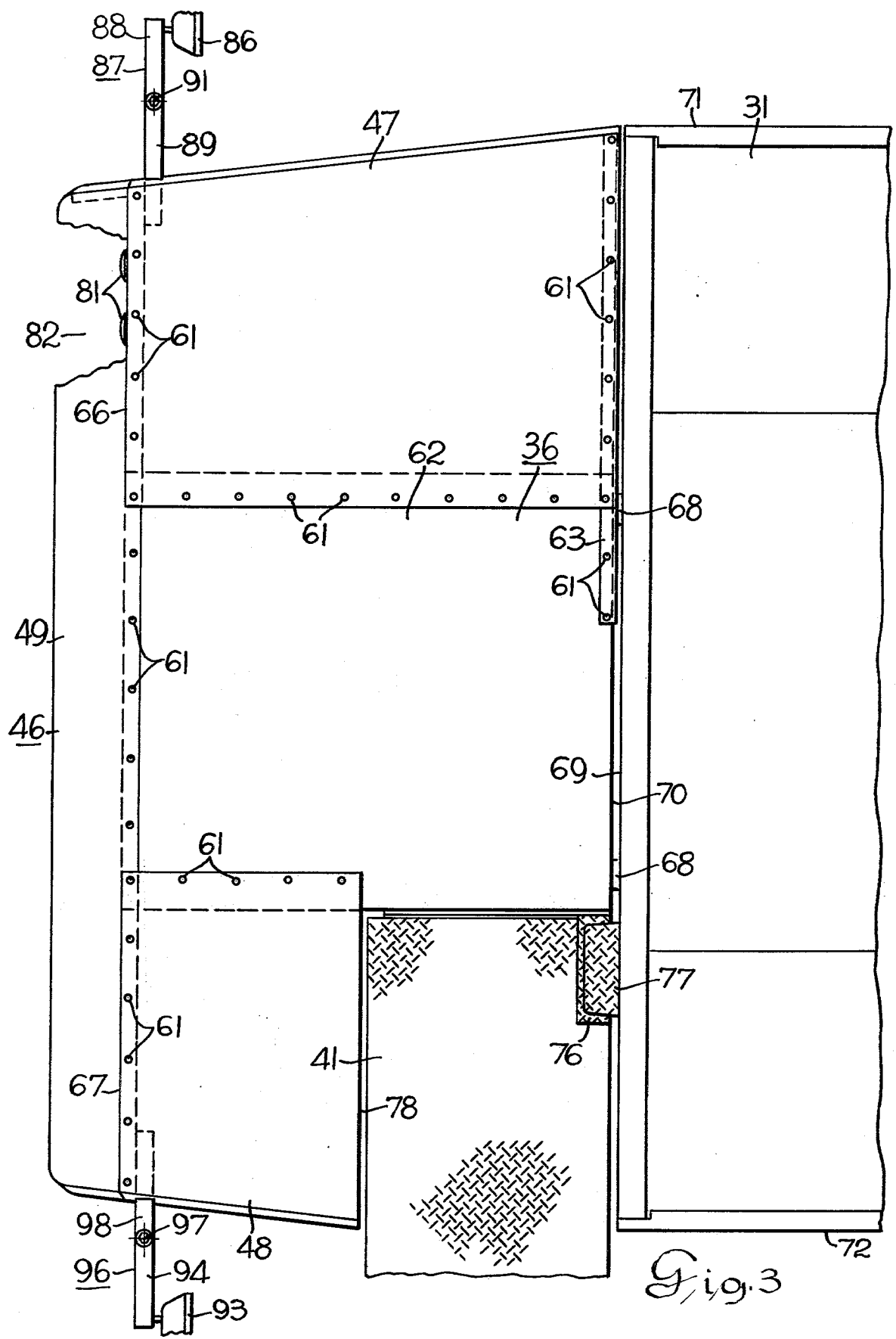
FIG. 3 is an enlarged partial top view showing the visor structure for the cab and a portion of the grain tank.
Figure 4:
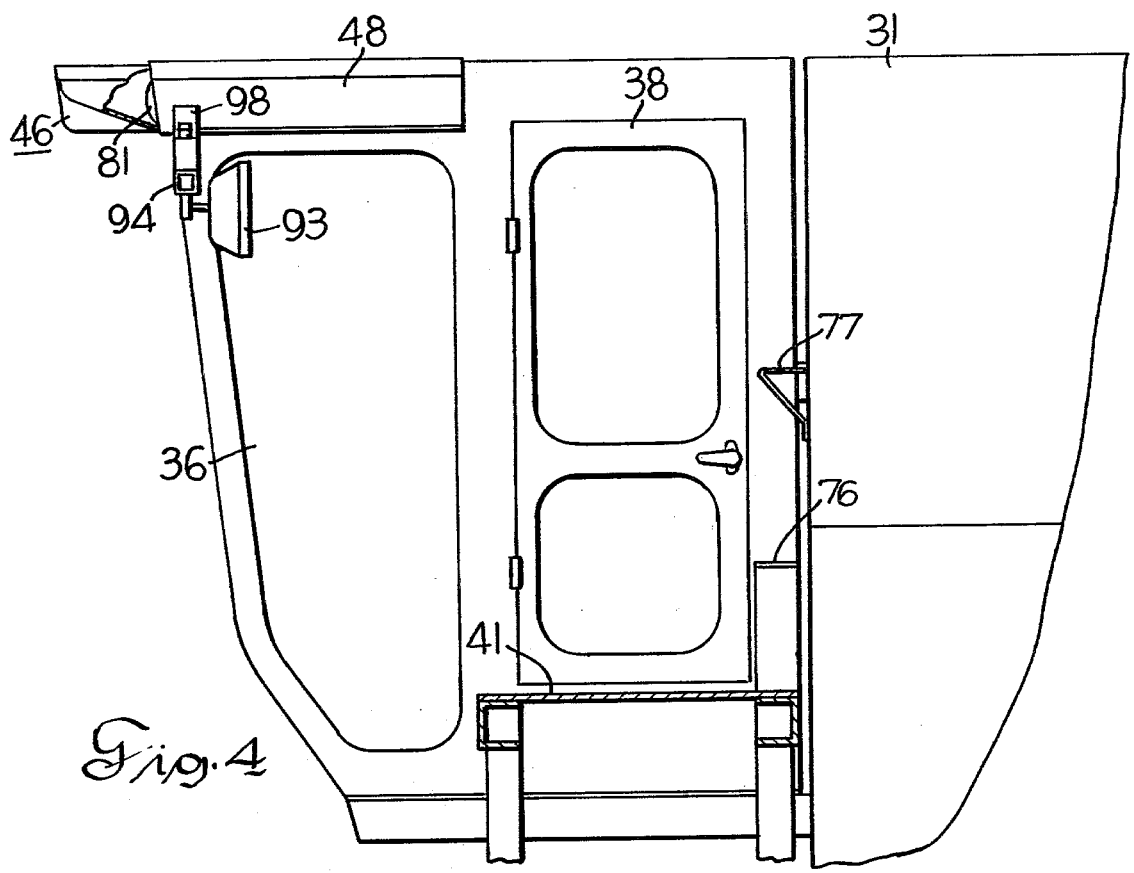
FIG. 4 is an enlarged left-side view of part of the harvester, including the operator's cab.
Figure 5:
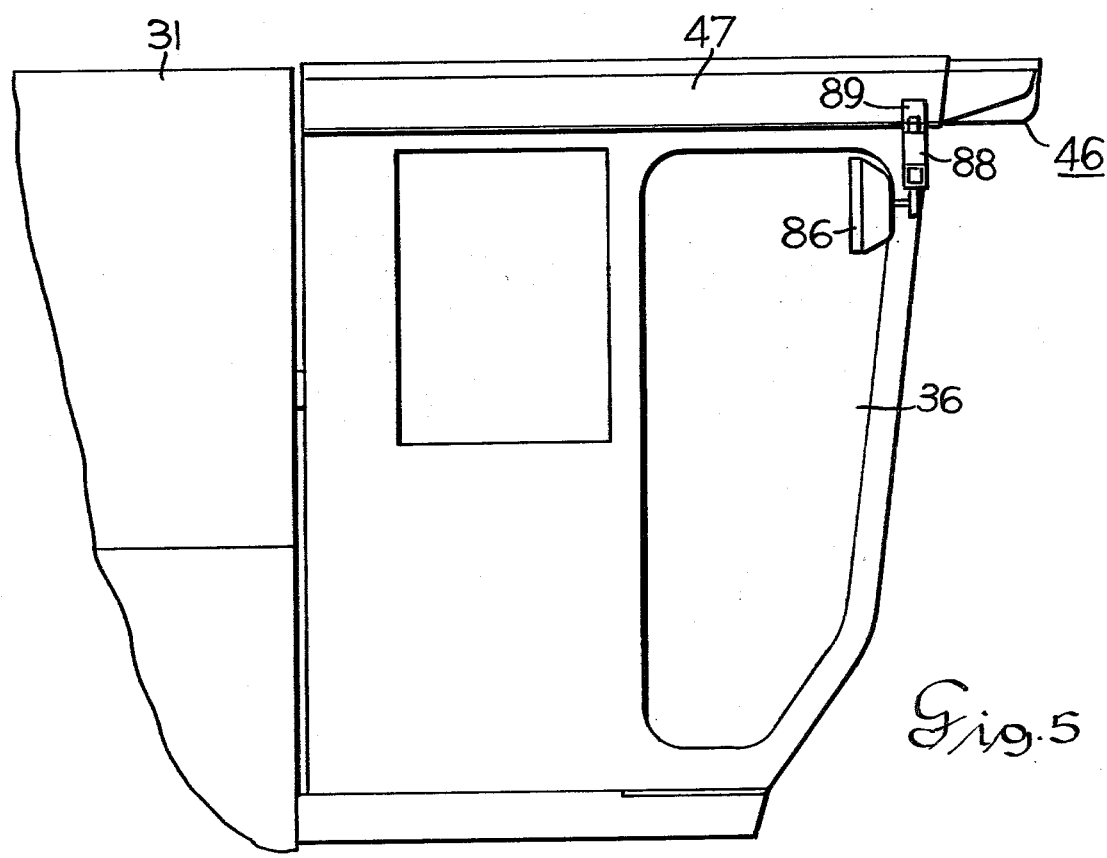
FIG. 5 is an enlarged right-side view of part of the harvester, including the operator's cab.

Referring also to FIGS. 3-6, the visor structure 46 includes a first horizontal part 47 of predetermined thickness which is secured by suitable fasteners 61 to the roof 62 of the cab 36. A horizontally extending angle 63 is secured to the visor part 47 by suitable fasteners 61 and is secured to the rear part of the roof 62 also by suitable fasteners 61. The angle 63 serves to stabilize the visor part 47 relative to the cab 36. A second horizontally extending part 48 of the visor structure 46 is secured to the roof 62 of the cab 36 by suitable fasteners 61. A third horizontally extending front part 49 of the visor structure 46 is secured to the front top portion of the roof 62 of the cab 36 by fasteners 61. The forward edges 66, 67 of the parts 47, 48 (which extend forwardly over the front part 49) are secured to the front part 49 by fasteners 61. The grain tank 31 is adjacent to, but not integrally formed with, the cab 36 and a pair of suitable spacers 68 are placed between the front wall 69 of the grain tank 31 and the rear wall 70 of the cab. The visor structure 46 is not secured to the grain tank but rather is secured solely to the cab 36 and, as shown in FIG. 3, the visor structure 46 extends laterally outwardly to approximately the laterally outer extremities 71, 72 of the grain tank 31. The visor structure 46 presents a vertically open area immediately above the walkway 41 so as to facilitate operator ingress and egress relative to the cab 36. Suitable steps 76, 77 are mounted on the walkway 41 and grain tank 31, respectively, so as to permit the operator or other personnel to step up on the side of the grain tank 31 and to observe the condition of the grain and to inspect or test it. As shown in FIG. 3, the rear edge 78 of visor part 48 is spaced from the grain tank 31 by a longitudinal distance slightly greater than the width of the walkway 41. In other words, the longitudinal dimension of part 47 is greater than the longitudinal dimension of part 48 by approximately the width of the walkway.

Two pairs of operating lights 81 are positioned in forwardly and downwardly open pockets 82, 83 in the front right and front left end portions of the visor structure 46 so as to illuminate the area forwardly of the cab 36. A rear view mirror 86 is secured to a bracket assembly 87 which includes a pair of components 88, 89 pivotally interconnected on a vertical axis 91. The component 89 is rigidly secured to the visor structure 46 by fasteners 92. In a similar manner, a rear view mirror 93 is mounted on the outer component 94 of a bracket 96. The component 94 is pivotally connected on a vertical axis 97 to an inwardly extending component 98 which in turn is rigidly secured to the visor structure 46 by fasteners 99.

Each of the parts 47, 48 of the visor structure 46 extend laterally outwardly from the top of the cab 36 a distance approximately two-thirds of the lateral width of the cab 36. The visor structure 46 is as wide laterally as the tread of the front wheels 13, 14 and as wide as the grain tank 31. The laterally extending parts 47, 48, together with forwardly extending part 49, provide excellent sun shielding for the cab. This construction reduces the heating of the cab by the sun's rays and reduces the energy requirements when the cab is equipped with an air conditioning system.

The visor structure serves as a support for widely spaced pairs of forwardly directed operating lights 81 and rear view mirrors 86, 93. The lights 81 mounted on the laterally outwardly extending parts 47, 48 of the visor structure 46 are spaced laterally outwardly from the cab 36 a substantial distance and are at an elevated position relative to the header 21, thereby providing excellent illumination of the area being harvested at night. The mirrors 86, 93 supported on the parts 47, 48 of the visor structure 46 are positioned laterally outwardly of the width of the grain tank, thereby permitting the operator in the cab 36 to observe to the rear at each lateral side of the combine. The cutout portion in the visor structure 46 above the walkway 41 provides a vertically open space which permits access to the top of the grain tank 31 and facilitates entry to and exit from the cab 36 by way of the access door 38.

The embodiments of the invention in which an exclusive property or privilege is claimed are defined as follows:

1. In a self-propelled harvester having a pair of laterally spaced front wheels and a pair of steerable rear wheels,
   a grain tank disposed crosswise of said harvester generally rearwardly of and above the axis of the front wheels,
   a cab disposed in front of and adjacent to said grain tank, said cab being disposed laterally in an intermediate position between said pair of front wheels, and
   a visor structure rigidly secured to said cab including a pair of horizontally extending parts extending laterally outwardly from the roof portion of said cab to substantially the lateral sides, respectively, of said grain tank.

2. The harvester of claim 1 and further comprising working lights supported on said visor structure at opposite sides of said cab for illuminating the area forwardly of said cab.

3. The harvester of claim 2 and further comprising rear view mirrors supported on said horizontally extending parts of visor structure and positioned laterally outwardly thereof.

4. The harvester of claim 1 and further comprising a horizontal walkway mounted on the harvester at one lateral side of said cab and extending laterally outwardly from the bottom thereof and wherein said cab includes an access door at said one lateral side adjacent the laterally inner end of said walkway and wherein said part of said structure, on said one lateral side of said cab, is so constructed and arranged as to leave a vertically open area therein above said walkway.

5. The harvester of claim 1 wherein the upper extremities of said cab, visor structure and grain tank lie substantially in the same generally horizontal plane.

6. The harvester of claim 1 wherein said visor structure also extends forwardly from the top of said cab.

7. The harvester of claim 1 wherein the lateral width of said grain tank is substantially the same as the tread of said front wheels.

8. In a self-propelled harvester, the combination comprising:
   an operator's station at the front end of said harvester including
   a cab with an access door at one lateral side thereof, and
   a visor structure secured to said cab and having horizontal parts extending laterally from each of the laterally opposite sides of said cab,
   operating lights mounted on said horizontal parts, respectively, operable to illuminate the area forwardly of said vehicle, and
   rear view mirror apparatus secured to said visor structure.

9. The harvester of claim 8 wherein said rear view mirror apparatus includes a pair of rear view mirrors secured, respectively, to said horizontal parts.

10. The harvester of claim 9 wherein said visor structure includes a part extending forwardly from said cab.

11. The harvester of claim 8 wherein a vertically open area exists in said visor structure adjacent said door to facilitate operator ingress and egress.

12. In a self-propelled harvester
    a pair of laterally spaced front wheels having a predetermined tread,
    a cab on the front of said harvester between said pair of front wheels,
    a horizontal walkway mounted on the harvester at one lateral side of said cab and extending laterally outwardly from the bottom thereof and above one of said front wheels, an access door in said one lateral side of said cab adjacent the laterally inner end of said walkway and a visor structure on said cab including a pair of horizontally extending parts extending laterally outwardly from the roof portion of said cab, said part extending outwardly at one lateral side presenting a vertical opening above said walkway facilitating ingress and egress of said operator to and from said cab through said access door.

13. The harvester of claim 12 and further comprising working lights supported on said visor structure at laterally opposite sides of said cab for illuminating the area forwardly of said cab.

14. The harvester of claim 13 and further comprising rear view mirrors supported on laterally opposite sides of said visor structure.

15. The harvester of claim 12 wherein the upper extremities of said cab and visor structure lie substantially in the same generally horizontal plane and said visor structure extends laterally to substantially the tread of said front wheels.

16. The harvester of claim 12 wherein said visor structure extends forwardly from the front top of said cab.

17. The harvester of claim 12 comprising an open top grain tank on said harvester at the rear of said cab, step means on said harvester adjacent the front of said grain tank, below said opening and above said walkway, by which the operator may climb upwardly through said opening to inspect the grain in said grain tank.

* * * * *